United States Patent [19]

Zelina et al.

[11] 4,023,067
[45] May 10, 1977

[54] INVERTER BALLAST CIRCUIT

[75] Inventors: William B. Zelina, Edinboro; James E. Hetherington, Girard, both of Pa.

[73] Assignee: Lighting Systems, Inc.

[22] Filed: Aug. 4, 1975

[21] Appl. No.: 601,255

Related U.S. Application Data

[63] Continuation of Ser. No. 398,959, Sept. 20, 1973, abandoned.

[52] U.S. Cl. .......................... 315/209 R; 315/177; 315/239; 315/DIG. 5; 315/DIG. 7
[51] Int. Cl.² ...................................... H05B 41/29
[58] Field of Search .......... 315/101, 105, 177, 219, 315/223, 239, 244, DIG. 2, DIG. 4, DIG. 5, DIG. 7, 209 R; 331/111, 112

[56] References Cited

UNITED STATES PATENTS

| | | | |
|---|---|---|---|
| 2,896,124 | 7/1959 | Brown | 315/219 X |
| 3,629,648 | 12/1971 | Brown et al. | 315/DIG. 7 |
| 3,869,640 | 3/1975 | Kolomyjec | 315/101 X |
| 3,882,354 | 5/1975 | May | 315/DIG. 7 |

*Primary Examiner*—Eugene R. LaRoche

[57] ABSTRACT

An inverter circuit suitable for use as a fluorescent lamp inverter ballast is disclosed. The inverter has the capability of starting the fluorescent lamp through regenerative feed-back techniques made possible by the amplification characteristic of the inverter switching transistor. Good efficiency at high frequency is provided by minimizing the transistor switching losses through use of resonant storage techniques and an unique feed-back system. Further, the normal energy lost in the feed-back circuit is eliminated by combining the resonant load means and the feed-back means into a single structure.

16 Claims, 2 Drawing Figures

4,023,067

INVERTER BALLAST CIRCUIT

This is a continuation, of application Ser. No. 398,959 filed Sept. 20, 1973 now abandoned.

BACKGROUND OF THE INVENTION

The continuing work in inverter circuits aimed at reasonably satisfying the efficiency and load requirements of the fluorescent lamp, but with increased emphasis of circuit simplicity and reduced cost has brought about this invention. The principal object of this work is to provide the most simple electronics for providing fluorescent light from a low voltage battery. My previous work has already described the outstanding advantages of the fluorescent lamp as the light source as opposed to the incandescent lamp. This advantage becomes more important when portable lighting sources (electric lanterns) are being considered. The lumens of light per watt of electric energy has a direct bearing on the cost, size, weight, etc. of the internal battery element.

The rechargeable battery technology has, on the other hand, experienced dramatic success in producing small, economical, rechargeable, and totally sealed batteries. These sealed batteries require a reasonable degree of protection during charging to preclude damage from overcharge. However, these sealed batteries do not limit themselves to the use of a charge indicator such as, for example, gravity balls that are used to determine state of charge in the liquid lead-acid battery. Therefore, a further intent of this invention is to teach the use of the same electronic circuitry required for the inverter with minimum additions of complexity can be used to prevent over-charge of the sealed storage battery, and also to give the user a visual indication of when the battery has reached a complete charged state.

REFERENCE TO PRIOR ART

U.S. Pat. No. 3,585,482 issued on June 15, 1971 to William B. Zelina.

OBJECTS OF THE INVENTION

It is an object of the invention to provide an improved ballast circuit for a fluorescent lamp.

Another object is to provide an improved inverter circuit wherein a magnetic means couples a resonant circuit to a source of power.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
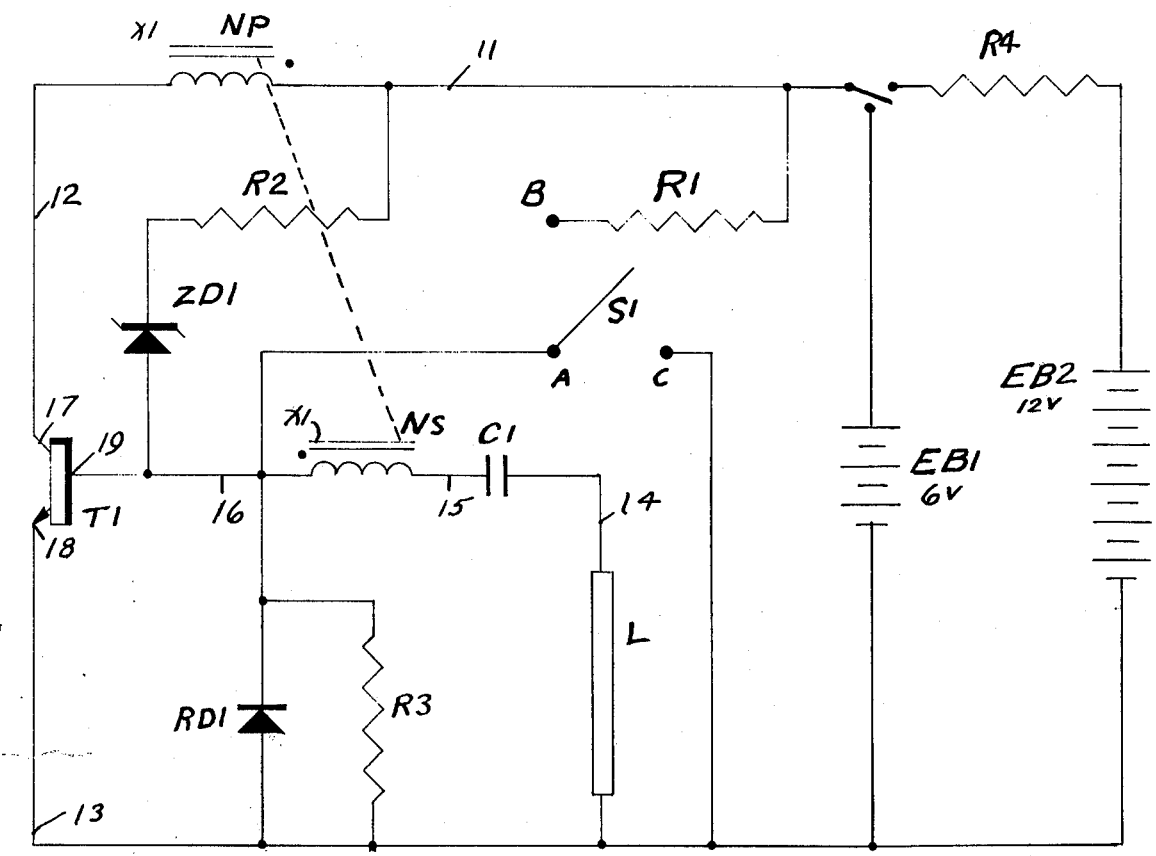
FIG. 1 is a schematic diagram of the circuit according to the invention.
Figure 2:
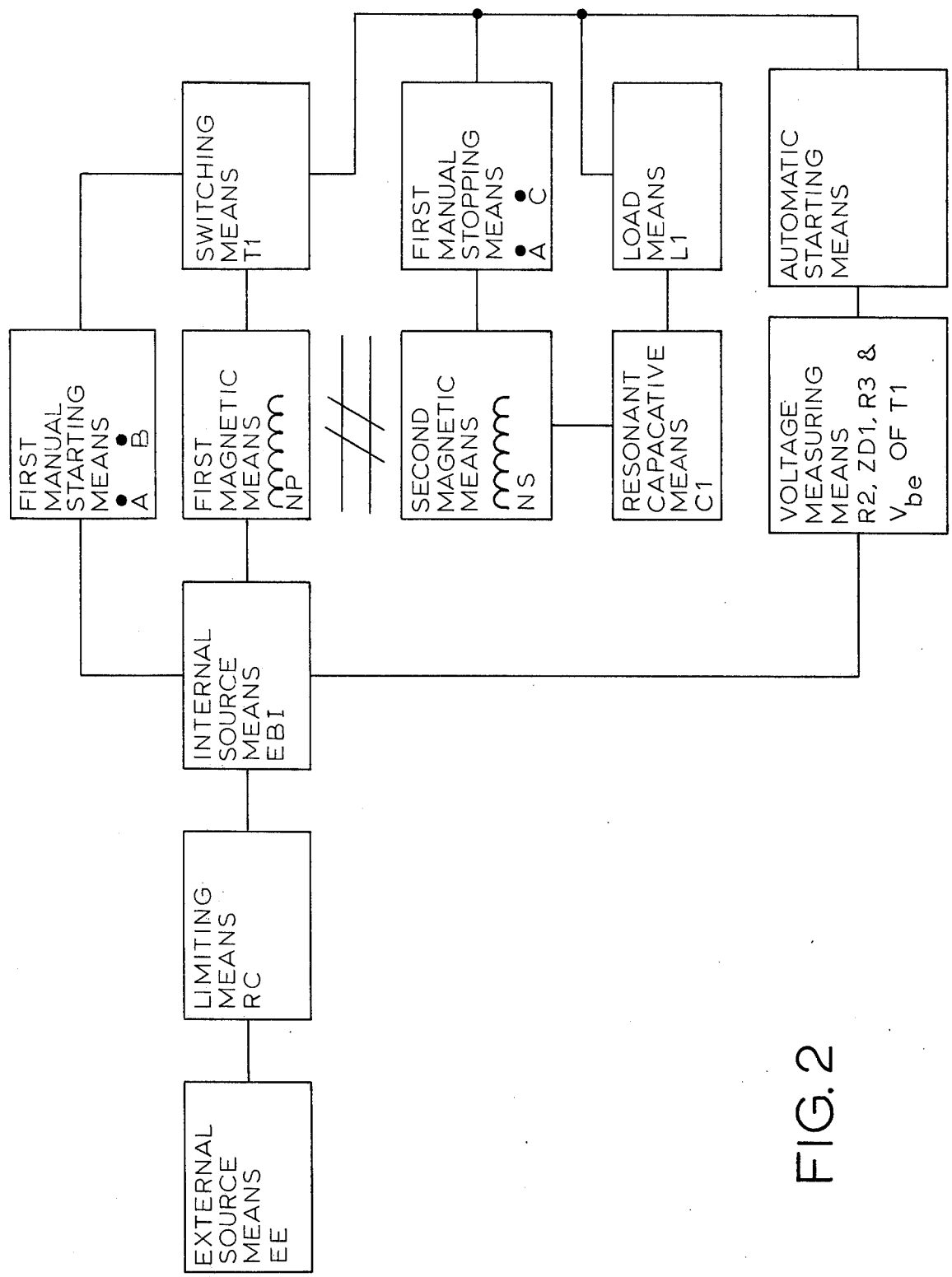
FIG. 2 is a block diagram of the circuit.

With reference to FIG. 1 a schematic diagram of the inverter circuit is shown that has proved to be a suitable solution of the previously described objective of the invention.

An analogy of a common well-known mechanical phenomenon will be used to describe the basic operating philosophy. We have all experienced the simple task of providing the necessary external stimuli to keep the simple child's playground swing and occupant in motion. As we well recognize the swing and mass of the swing's occupant is, in fact, a simple pendulum oscillating at its natural frequency. When we, in a partial cycle basis, provide the input stimuli to maintain this resonant phenomenon we simply provide that energy to the system to sustain oscillation as is dictated by the losses of the system. As, for example, if the occupant of the swing were to use some means for increasing the wind resistance losses such as perhaps a modified sail or parachute, the input energy would be proportionately increased to maintain the swing in a pre-determined amplitude of oscillation.

The electronic circuit shown in FIG. 1 provides the same cyclic input of energy to maintain the electric resonant system including the load means in oscillation to a pre-determined voltage amplitude.

Transistor T1 connnects the internal battery $E_{b1}$ to the primary of the magnetic structure X1. The same magnetic structure has a secondary winding $N_s$ which is wound for good coupling to the primary $N_p$. The instantaneous polarity of these windings are such that any current flowing in $N_p$ will result in a current $N_s$ in a direction to turn on transistor T1 by providing a current from base to emitter of transistor T1 through the load means which in this case is a fluorescent lamp, through the capacitor C1 which constitutes the capacitive element of the resonant means and back to the secondary winding $N_s$. The secondary winding $N_s$ and its associated magnetics constitute the inductive element of the resonant means. To start the inverter one momentarily connects A to B to provide a momentary external turn on stimuli to transistor T1, thereby starting the system into oscillation.

An important by-product of this simple fluorescent lighting inverter ballast approach is found in its regenerative means made possible by using the resonant load circuit loop for its feed-back means. To understand this important advantage, it should be stated that the fluorescent lamp experiences a degradation of the active materials of its cathode in proportion to the current-time integral experienced during each start. Upon the momentary closing of intermittant switch S1 which closes terminal A to B, the lamp experiences a voltage level that initiates a small ionizing current in the combination load feed-back loop which in turn is amplified by T1, thereby increasing the primary current drawn from the battery source to respectively increase the lamp current. This regeneration results in very fast ionization of the fluorescent lamp without the use of any pre-heat energy thereby simplifying the entire inverter system. Further, it has been experienced that this regenerative starting factor becomes very valuable in the starting of very low temperature lamps such as might be experienced with a portable light user operating in a cold environment such as ice fishing. By judicially selecting R1 and by maintaining contact of A and B during the starting portion of the cycle, we actually provide an input of starting energy greater than what is required for normal lamp operation. This provides for even better low temperature starting of the fluorescent lamp.

In the pursuit of simplicity, the single transistor switch necessary for the inverter system was also used for the turn off means of the inverter. A simple momentary contact of the A to C terminals will stop the inverter. This is made possible because the regenerative load current is now by-passed from the switching element T1 and after a few cycles this energy is dissipated in the load means and the inverter is now in the off state. A few micro-amps of leakage current is experienced as a load when T1 is off; but this level of current is generally less than the internal loss of the battery. The rectifier diode RD1 and the by-pass resistor R3 provide the following necessary circuits functions. Diode RD1 provides a path for the current in the load loop during the portion of the cycle that transistor T1 is turned off. Resistor R3 provides the necessary stability of transistor T1 to preclude spurious input noise from causing the inverter to commence oscillation. R3 has a further function when considered in conjunction with R2 which will be described in the charging portion of this inverter circuit teaching.

An external battery labeled $E_{b2}$ or a transformer rectified battery eliminator can be used as a charging source. Resistor R4 is selected so that the current demands of the inverter circuit will balance the input current from the external DC source $E_e$ during operation. Zener diode ZD1 is selected to match the full charge voltage of the internal battery $E_{b1}$. As a practical matter to make possible the precise adjustment of the full charge triggering voltage, resistor R2 is added to the circuit and those skilled in the art realize that the triggering voltage can be adjusted as a direct portion of R2 divided by R3 times the transistor T1 emitter base turn on voltage. Therefore, when recharging the portable lamp means, one simply provides suitable external 12V source energy, e.g, for example, the cigarette lighter of the automobile. When the battery reaches full charge voltage, the lamp L-1 which may be used for example, in an electric lantern, will automatically turn on by the action of the breakover of ZD1 which will duplicate the momentary starting action of touching terminals A and B. The balancing of the input current through RC with the current of the inverter ballast and the resultant droop action of the battery $E_{b1}$ after the inverter has started all combine to prevent damaging overcharge of the internal sealed battery.

The inverter circuit is shown connected to the fluorescent lamp L1 as a load but this load could be other than a fluorescent light. The first circuit is made up of the battery $E_{b1}$, line 11, transformer primary $N_p$, line 12, transistor terminals 17, 18 and line 13.

A resonant circuit is made up of lamp L1, connected to capacitor C1 by line 14, capacitor C1 is in turn connected to transformer secondary $N_s$ by line 15, and line 16 connects the transformer secondary $N_s$ to the resistor R3 and to the diode RD1. Line 13 connects the opposite side of the resistor R3 and the opposite side of diode RD1 to the lamp R1. A starting circuit is made up of resistor R1, switch S1, and line 16 connected to the base 19 of transistor T1. A stopping circuit is made up of switch terminals A and C of switch S1 which may connect line 16 to line 13 thereby connecting a short circuit between the base 19 and emitter 18 of transistor T1.

The user can, if he wishes, continue to use the light source from the external battery supply with minimum discharge being experienced by the internal battery $E_{b1}$. On the other hand, he now has assurance that he has a fully charged battery and can in fact check this by momentarily closing $S_{w1}$ thereby connecting A to C to turn off the inverter and waiting momentarily until it again turns on. This action corresponds very well to the peak point phenomenon of charging storage batteries described in my U.S. Pat. No. 3,548,482, issued June 15, 1971.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An inverter circuit for a fluorescent lamp comprising a load circuit,
    and a control circuit including resonant means,
    an electronic switch having two power terminals and a control terminal,
    a magnetic means having a primary element and a secondary element in magnetic coupled relation with each other,
    said load circuit comprising a power source connected in series with said primary element and said power terminals of said electronic switch,
    said control circuit resonant means including said fluorescent lamp and said secondary magnetic element connected in series with each other and connected to said control terminal of said electronic switch to cause said switch to conduct when current flows in said primary element,
    one of said power terminals of said electronic switch being connected to said primary element whereby said fluorescent lamp is actuated by resonant current flowing through said control circuit resonant means.

2. The circuit recited in claim 1 where said magnetic means comprises a transformer and said primary means and said secondary means comprise primary windings and secondary windings of said transformer.

3. The circuit recited in claim 1 wherein said electronic switch comprises a transistor having its emitter and collector comprising said switch terminals connected in series with said primary winding, and its base comprising said control element connected to said secondary winding.

4. The circuit recited in claim 1 wherein starting means is provided adapted to connect said power source to said control element for starting an excited current whereby a resonant current is induced through said primary winding and said secondary winding of said transformer into said resonant circuit.

5. The circuit recited in claim 1 wherein said resonant circuit comprises a capacitor,
    and said control circuit resonant means comprises a capacitor connected in series with said secondary winding
    and with said fluorescent lamp.

6. The circuit recited in claim 5 wherein said control circuit resonant means comprises a closed circuit including said capacitor, said secondary winding, said fluorescent lamp and a diode connected parallel with said fluorescent lamp.

7. The circuit recited in claim 6 wherein said load circuit comprises a battery,
    said electronic switch, said primary winding and said battery being connected in series with each other.

8. The circuit recited in claim 7 wherein a manual starting means is provided for said circuit,
said manual starting means comprises a switch for connecting said battery to said control element of said electronic switch.

9. The circuit recited in claim 8 wherein a stopping means is provided for said circuit,
said stopping means comprising a switch for connecting said control terminal of said electronic switch to one of said power terminals of said electronic switch.

10. An inverter circuit for a fluorescent light comprising,
lamp means,
capacitor means,
a first inductive means,
second inductive means,
switching means having a control element,
said lamp means, said capacitor means and said first inductive means being connected in series,
an electronic valve having a first power element and a second power element,
said lamp, said capacitor means and said second inductive means comprising a control circuit,
and said second inductive means and said first power element and said second power element being connected in series with each other and comprising a power circuit,
said control circuit being connected to said control element of said switching means,
magnetic core means connecting said first inductive means to said second inductive means,
and means for connecting a power source to said power circuit whereby current flows in said second inductive means and induces current in said first inductive means.

11. The circuit recited in claim 10 wherein said switching means is an electronic valve and said control means is a control element on said electronic valve.

12. The circuit recited in claim 10 wherein said control element is a transistor.

13. The circuit recited in claim 12 wherein said circuit has a starting means and said starting means comprises a manually actuated switch for connecting said control element to said source of power.

14. The circuit recited in claim 13 wherein said first magnetic means and said second magnetic means comprises a primary and a secondary winding on a transformer.

15. The circuit recited in claim 14 wherein manual means is provided for stopping said resonant current,
said manual means comprises a switch for connecting a bypass circuit from said electronic valve.

16. A ballast circuit for a fluorescent lamp comprising
a capacitor,
a transformer having a primary and a secondary winding,
an electronic valve having a control element and a first power terminal, a second power terminal, a power source,
said lamp, said secondary winding, said capacitor being connected in series with each other comprising a resonant circuit and to said first power terminal of said electronic valve,
means connecting said resonant circuit to said control element of said electronic valve,
said primary winding, said first power terminal and said second power terminal, and said power source being connected in series with each other forming an exciting current for said transformer,
starting means adapted to connect said power source to said control element for starting said exciting current whereby a resonant current is induced from said primary winding into said secondary winding of said transformer into said resonant circuit,
a first diode and a first resistor are connected in parallel with each other and in parallel with said control element and said first power element.

* * * * *